United States Patent
Bowen

(10) Patent No.: US 11,603,881 B2
(45) Date of Patent: Mar. 14, 2023

(54) PISTON ARRANGEMENT

(71) Applicant: NEWLENOIR LIMITED, London (GB)

(72) Inventor: Ryan Bowen, London (GB)

(73) Assignee: NEWLENOIR LIMITED, London (GB)

( * ) Notice: Subject to any disclaimer, the term of this patent is extended or adjusted under 35 U.S.C. 154(b) by 0 days.

(21) Appl. No.: 17/437,825

(22) PCT Filed: Feb. 24, 2020

(86) PCT No.: PCT/GB2020/050433
§ 371 (c)(1),
(2) Date: Sep. 9, 2021

(87) PCT Pub. No.: WO2020/183126
PCT Pub. Date: Sep. 17, 2020

(65) Prior Publication Data
US 2022/0154763 A1 May 19, 2022

(30) Foreign Application Priority Data
Mar. 11, 2019 (GB) .................................... 1903300

(51) Int. Cl.
*F02B 75/32* (2006.01)
*F16C 7/02* (2006.01)
*F02F 3/00* (2006.01)

(52) U.S. Cl.
CPC ............... *F16C 7/023* (2013.01); *F02F 3/00* (2013.01)

(58) Field of Classification Search
CPC ...... F01B 9/06; F01B 2009/061; F01B 9/047; F01B 9/026; F16H 19/043
(Continued)

(56) References Cited

U.S. PATENT DOCUMENTS 1,374,164 A 4/1921 Nordwick
1,654,378 A 12/1927 Marchetti
(Continued)

FOREIGN PATENT DOCUMENTS

DE 102011016177 A1 10/2012
FR 2655378 A1 6/1991
(Continued)

OTHER PUBLICATIONS

Applicant: Newlenoir Limited; "Piston Arrangement"; PCT International Appl. No. PCT/GB2020/050433; filed: Feb. 24, 2020; PCT International Search Report and Written Opinion; Authorized Officer: Bo Paulson, dated: May 19, 2020; 13 pgs.
(Continued)

*Primary Examiner* — Long T Tran
*Assistant Examiner* — James J Kim
(74) *Attorney, Agent, or Firm* — Tarolli, Sundheim, Covell & Tummino LLP

(57) ABSTRACT

A piston arrangement includes a piston movable within a cylinder in reciprocating motion along a piston axis, a rack movable with the piston, a sector gear configured to engage and disengage the rack and rotatable around a sector gear axis, a track adapted to rotate relative to the cylinder around a track axis of rotation, the piston being coupled to the track. The sector gear and the track are coupled in rotation. The track may have a shape such that the movement of the piston coupled to the track is substantially non simple harmonic. Also, an internal combustion engine comprising the piston arrangement.

20 Claims, 7 Drawing Sheets

(58) Field of Classification Search
USPC .................................................... 123/197.1
See application file for complete search history.

(56) References Cited

U.S. PATENT DOCUMENTS

| | | | | |
|---|---|---|---|---|
| 4,638,676 | A * | 1/1987 | Lively | F16H 19/08 |
| | | | | 74/31 |
| 7,475,627 | B2 | 1/2009 | Irick et al. | |
| 8,365,620 | B2 * | 2/2013 | Haka | F01B 9/047 |
| | | | | 74/33 |
| 2004/0261750 | A1 * | 12/2004 | McKeown | F01B 9/047 |
| | | | | 123/197.1 |
| 2005/0172918 | A1 * | 8/2005 | Humphries | F01B 9/06 |
| | | | | 123/56.2 |
| 2008/0092846 | A1 * | 4/2008 | Heimbecker | F01B 9/06 |
| | | | | 123/197.4 |
| 2016/0333693 | A1 * | 11/2016 | Bowen | F02B 75/40 |

FOREIGN PATENT DOCUMENTS

| | | |
|---|---|---|
| JP | S5688918 A | 7/1981 |
| WO | 2018/0162876 A1 | 9/2018 |

OTHER PUBLICATIONS

United Kingdom Application No. GB 1903300.0; Combined Search and Examination Report; dated Aug. 15, 2019; 5 pgs.

\* cited by examiner

PISTON ARRANGEMENT

CROSS-REFERENCE TO RELATED APPLICATION

This patent application is a U.S. National Stage Application filed under 35 U.S.C. § 371 of PCT/GB2020/050433, filed Feb. 24, 2020, and entitled PISTON ARRANGEMENT, which International Application claims the benefit of priority from United Kingdom Patent Application No. GB 1903300.0, filed on Mar. 11, 2019. The entire contents of each of the above-identified patent applications are incorporated herein by reference.

FIELD OF THE INVENTION

The present invention relates to a piston arrangement and to an internal combustion engine comprising the piston arrangement.

BACKGROUND OF THE INVENTION

Most engines that use an expansion of a fluid to drive a piston convert the reciprocating motion of the piston into rotating motion by way of a crank shaft coupled to the piston via a connecting rod. An alternative arrangement for transferring power from a piston to a rotating shaft is disclosed in WO 2015/107330 A2, in which a piston is coupled to a track by a follower. The follower runs on a cam surface formed on the track, which rotates about an axis. However, due to the forces involved in transferring power from the piston, the cam surface and follower can be subjected to high loads.

SUMMARY OF THE INVENTION

According to the invention there is provided a piston arrangement comprising: a piston movable within a cylinder in reciprocating motion along a piston axis; a first engagement profile movable with the piston; a rotatable element having a second engagement profile configured to engage and disengage the first engagement profile and rotatable around a first axis; a track adapted to rotate relative to the cylinder around a track axis of rotation, the piston being coupled to the track; wherein the rotatable element and the track are coupled in rotation.

With such an arrangement power can be transferred between the piston and the rotatable element via the engagement profiles so that wear on the track due to coupling of the piston to the track is reduced.

The first engagement profile may be rigidly coupled to the piston. Optionally, the first engagement profile may form part of a piston rod which is rigidly coupled to the piston. With such an arrangement, efficient power transfer between the piston and the first engagement profile can be ensured.

The track may be rigidly coupled to the rotatable element. Optionally, the track and the rotatable element may both be parts of a single component, e.g. a cam. In such an arrangement, the track axis and the first axis may be the same axis.

The piston arrangement may further comprise a follower coupled to the piston, the follower being arranged to run along a surface of the track. The follower may be in sliding contact with the track, or may be in rolling contact with the track, or the follower may be arranged in both sliding and rolling contact with the track.

The piston arrangement may further comprise a plurality of followers each follower being arranged to run along the surface of the track. With such an arrangement, the forces between the track and the followers can be better distributed, so that wear is reduced.

The piston arrangement may comprise a plurality of concentric tracks and at least one follower in contact with each track. With such an arrangement, the wear on each track can be reduced. The centre of each track may be the rotational centre of the track coincident with the track axis, about which the track is adapted to rotate.

The track may have a shape such that the movement of the piston coupled to the track is substantially non simple harmonic. For example, the displacement profile of the piston within the cylinder may, for example, include multiple different local top dead centre positions at different heights and/or multiple different bottom dead centre positions at different heights. Equally, the piston may expand and contract at different speeds while the rotatable element maintains a constant rotational velocity.

The tracks may be shaped such that the piston is arranged to reciprocate twice for each complete rotation of the rotatable element.

The rotatable element may be arranged to rotate once during multiple rotations of the track.

The first engagement profile may be arranged to reciprocate along a linear axis. The linear axis of the first engagement profile may be a fixed distance from the first axis.

The piston arrangement can be used in a four stroke engine.

The rotatable element may be a sector gear and the sector gear may be toothed around approximately 25% of its circumference. With such an arrangement, the sector gear and rack may engage only on an expansion stroke of a four stroke cycle.

The or each track may be formed as an elongate protrusion from a plate, the plate being substantially planar in a plane normal to the track axis. With such an arrangement, there is provided a resilient track.

The rotatable element may be coupled in rotation to the track by splines formed on the plate.

The piston arrangement may further comprise a support section positioned adjacent to the first engagement profile when the first engagement profile is engaged with the second engagement profile. With such an arrangement, lateral movement of the first engagement profile during the engagement can be reduced.

The support section may be coupled to the rotatable element, the support section being arranged to rotate with the rotatable element. With such an arrangement, a single support section can be used to support multiple first engagement profiles.

In an example, the piston is a first piston and the first engagement profile is a first first engagement profile, and the piston arrangement further comprises a second piston and a second first engagement profile moveable with the second piston, the second first engagement profile configured to engage and disengage the second engagement profile. With such an arrangement, the same track and rotatable element may be used for multiple pistons in order to provide an engine having a better power to weight ratio.

In an example, the second piston and the first piston are arranged to move in opposite directions. With such an arrangement, there is provided a more balanced piston arrangement.

According to a second aspect of the invention, there is provided an internal combustion engine comprising a piston arrangement according to the first aspect. In an alternative arrangement, the piston arrangement may form part of a pump, e.g. having an input shaft which drives reciprocating motion of the pistons, such as a fluid pump.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
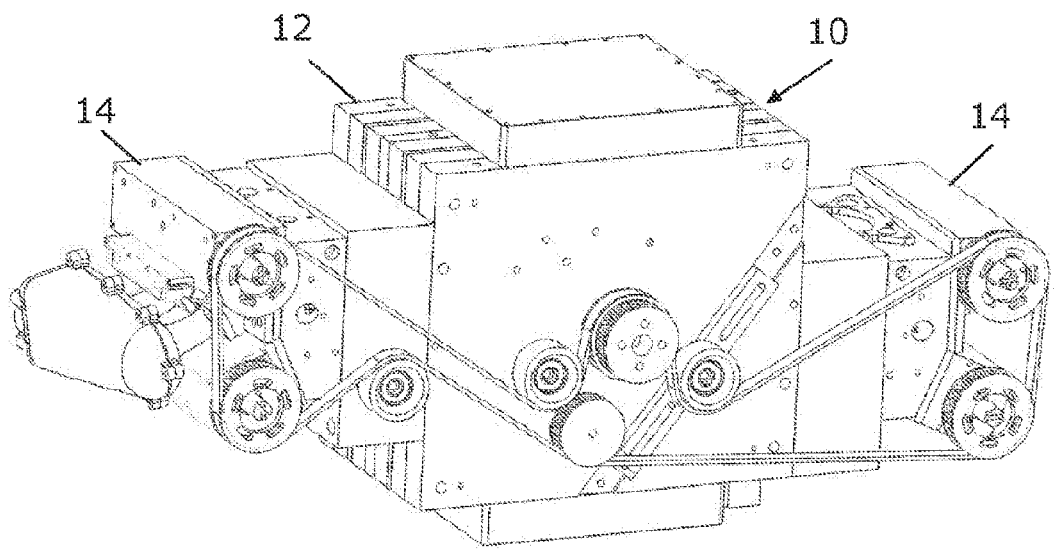
FIG. 1 shows an engine.

FIG. 1 shows an internal combustion engine 10 comprising a cylinder block assembly 12 and two head assemblies 14. The block assembly 12 comprises a plurality of casing members or plates, having different shapes such that a cylinder block 12 is formed when they are combined.

Figure 2:
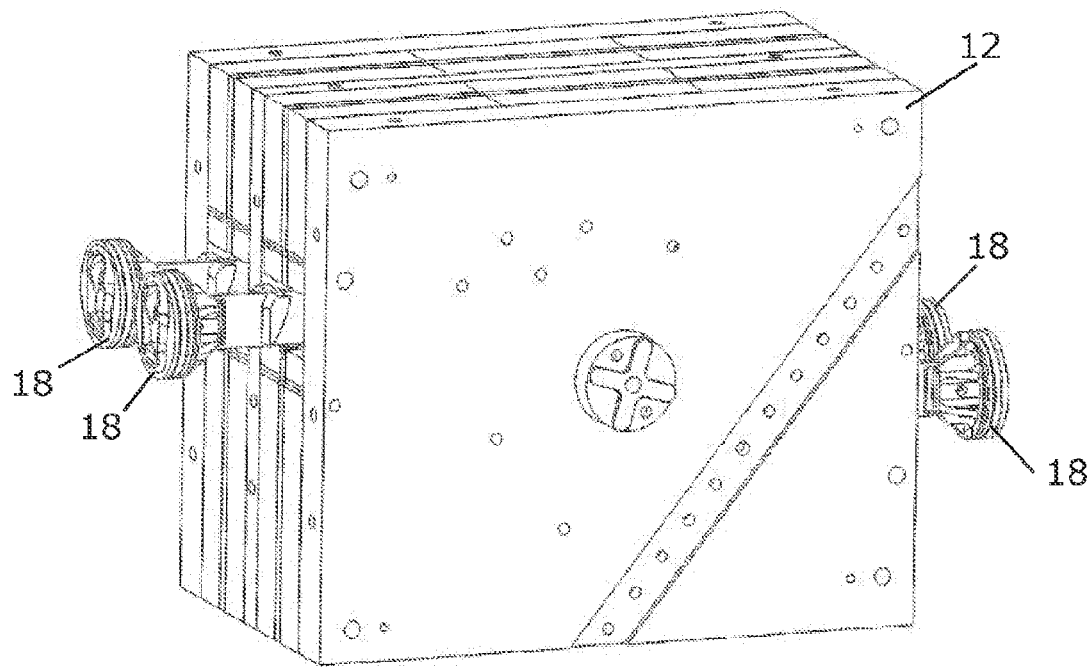
FIG. 2 shows the engine with various component's omitted.

FIG. 2 shows the engine 10 with the head assemblies 14 removed. The head assemblies contain cylinder bores, each receiving a respective cylinder liner, each cylinder liner receiving a respective piston. In this view, the pistons 18 can be seen protruding from the cylinder block 12. The engine 10 has a total of four pistons coupled in an opposed relationship to two tracks (not visible in FIG. 2). The engine 10 therefore includes four piston assemblies and the structure and functioning of the first piston assembly will be described in detail, although it will be appreciated that the second, third and fourth piston assemblies are structurally and functionally similar to the first piston assembly. While four pistons 18 are shown in FIG. 2, it will be understood that any other number of pistons may be used, for example two pistons or eight pistons.

Each piston assembly comprises a piston 18 with a piston head movable within the cylinder liner. The piston head is coupled to an output shaft, having an axis of rotation, via a track on a cam wheel 25.

Figure 3:
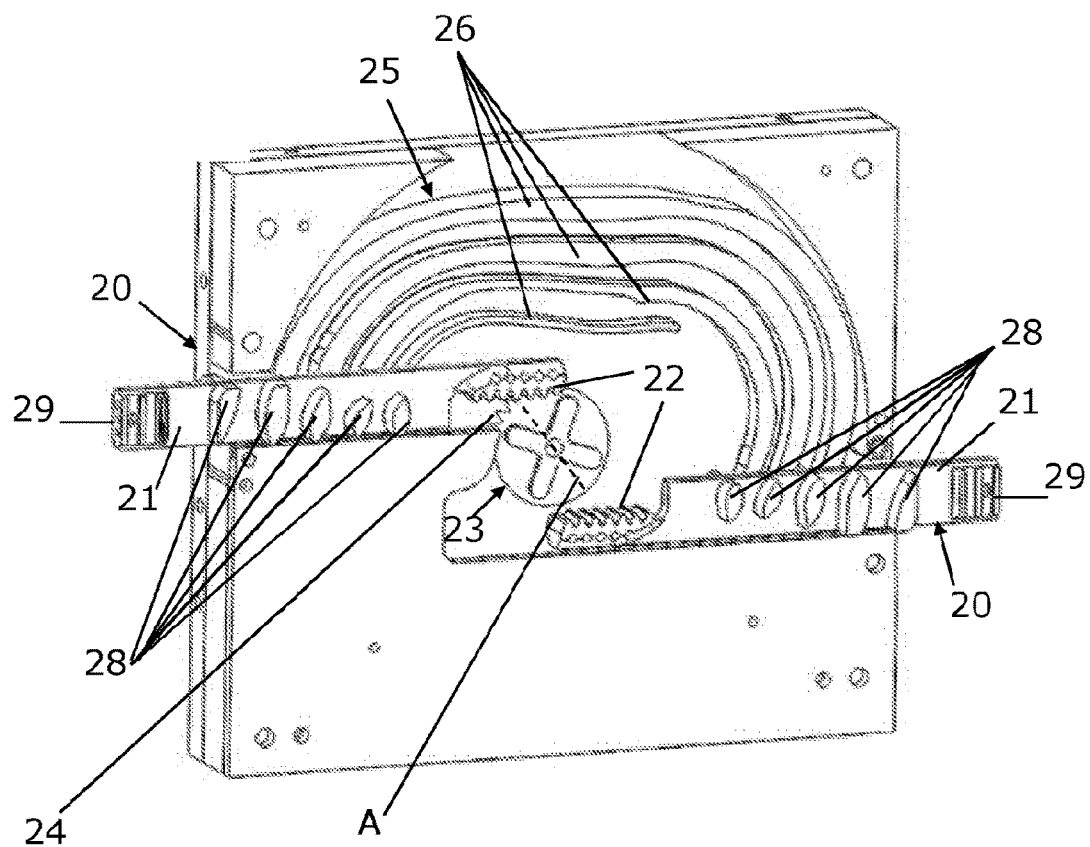
FIG. 3 shows the engine with further components omitted such that a piston arrangement is visible.

In FIG. 3, several of the plates of the block 12 have been removed so that one of the cams 25 coupled to respective piston rods 20 of the first and second piston assemblies are visible. The piston rods 20 are arranged to slide with respect to the plates of the block 12 and project from the edge of the plates. As can be seen in the figures, the piston rods 20 have an elongate shape, predominantly formed of a generally rectangular elongate member 21. The elongate member 21 extends between a rack 22 and a connecting end 29, the connecting end 29 arranged for connecting to the respective piston head of pistons 18.

In each piston assembly, the piston 18 is coupled to the track by a follower which engages the track. In the illustrated example, a plurality of followers 28 are disposed on the elongate member 21 and the cam 25 has a plurality of tracks 26 for engaging with the plurality of followers 28. The cam 25 is mounted for rotation about an axis A. As the cam 25 carrying the one or more tracks 26 rotates about the axis A, the one or more followers 28 engage with the one or more tracks 26, causing reciprocating movement of the piston rods 20 and thereby reciprocating movement of the pistons 18.

Figure 4:
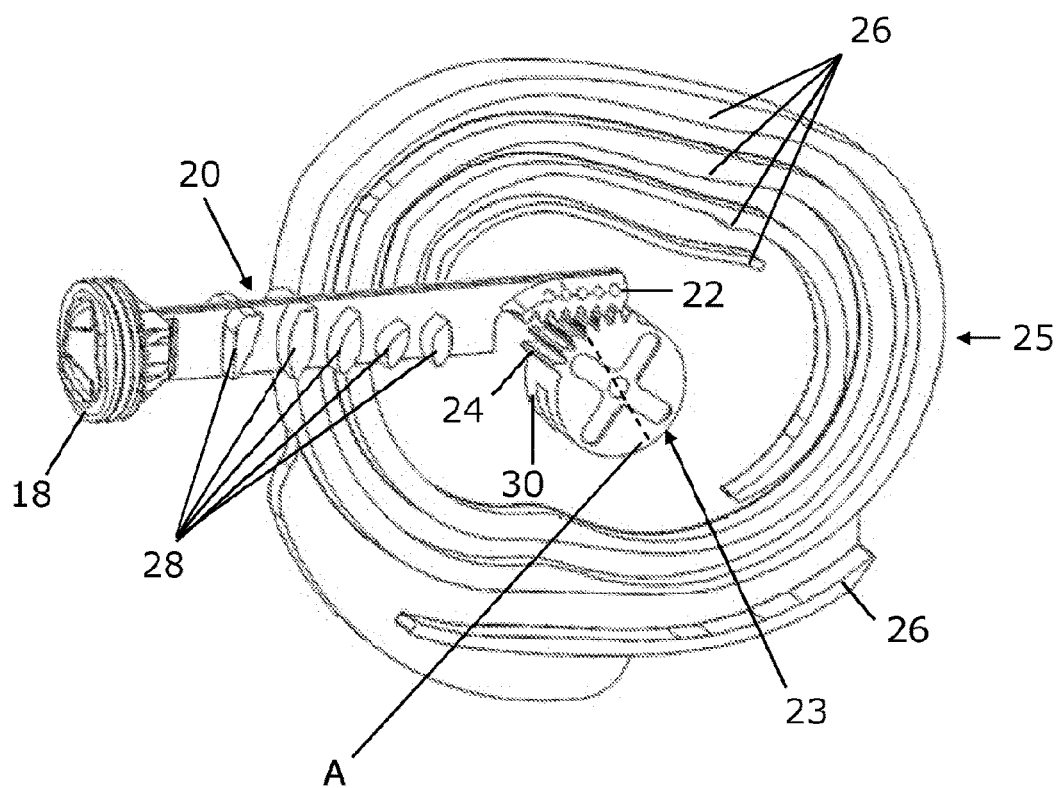
FIG. 4 shows the piston arrangement.

As best shown in FIG. 4, a sector gear 23 is provided for engaging and disengaging with the racks 22. The sector gear 23 has a toothed portion 24 which extends around approximately 25% of the circumference of the sector gear. The sector gear 23 is also rotatable about axis A. The sector gear 23 is splined or otherwise connected to the cam 25 and to the output shaft of the engine, such that the rotational speeds of the output shaft, the cam 25 and the sector gear 23 are matched.

The sector gear 23 also has a cut out 30 in the non-toothed part of the gear, which is arranged to avoid the sector gear impeding the elongate members 21 of the piston rods 20.

From FIG. 4 it can be seen that some of the plurality of tracks 26 may be complete rings so that one of the followers 28 is engaged with the track 26 throughout the duration of a cycle (complete revolution of the cam 25), whereas other tracks 26 may only extend around a sector of the cam, such that one of the followers 28 may engage with and disengage from the track 26 at different parts of the cycle.

It is to be noted that the tracks 26 of the cam 25 shown in FIG. 4 have shapes such that the movement of the piston 18 coupled to the tracks 26 is substantially non simple harmonic. For example, the displacement profile of the piston within the cylinder may, for example, include multiple different local top dead centre positions at different heights and/or multiple different bottom dead centre positions at different heights. It can be seen that the tracks 26 of the cam 25 have two radial minima and two radial maxima, so that the piston 18 reciprocates twice for each revolution of the cam 25.

It will be appreciated that the track or tracks and the follower or followers may take a variety of different shapes so that the profile of the track and therefore the movement of the piston coupled to the track can be defined to achieve an optimised performance during the cycle. This tailoring of the piston movement to be substantially non-sinusoidal is distinctly different from conventional crank and con-rod type piston arrangements, which necessarily achieve sinusoidal or substantially sinusoidal piston movements. Of course, the track or tracks 26 and follower or followers 28 may be arranged to provide a sinusoidal or substantially sinusoidal piston movement if desired.

This arrangement of the tracks 26, coupled with the sector gear 23, means that the piston can be moved by the tracks 26, but the racks 22 will engage with the sector gear 23 only during a portion of the cycle. In particular, for the internal combustion engine 10, the racks 22 will engage with the sector gear 23 only during an expansion stroke of the cycle so that the peak force exerted on the tracks 26 by the followers 28 is reduced.

Figure 5:
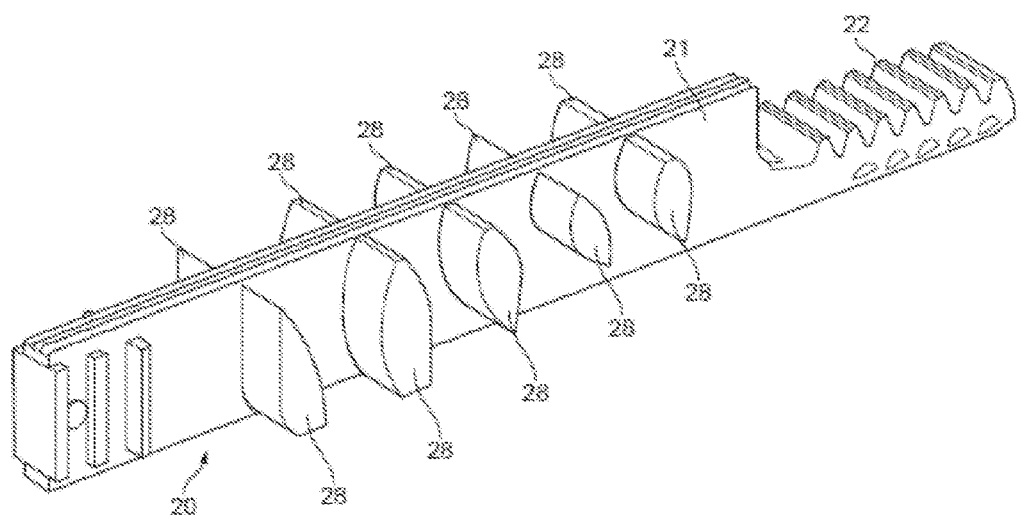
FIG. 5 shows a piston rod.

FIG. 5 shows an isometric view of the piston rod 20. While the piston rod 20 of the illustrated example has a cuboidal shaped member 21, it will be understood that any other shape of elongate member, such as a cylinder or triangular prism may be used.

It can also be seen that the followers 28 are shaped so as to slide smoothly over the tracks 26 without the need for any rolling elements. The obviation of the need for rolling elements may be part achieved by the use of the sector gear 23, which carries a significant portion of the load from the piston during the drive stroke. However, it will be appreciated that the follower or followers provided on the piston rod may be rolling elements, or may be followers designed to both slide and roll by contact with the track.

Figure 6:
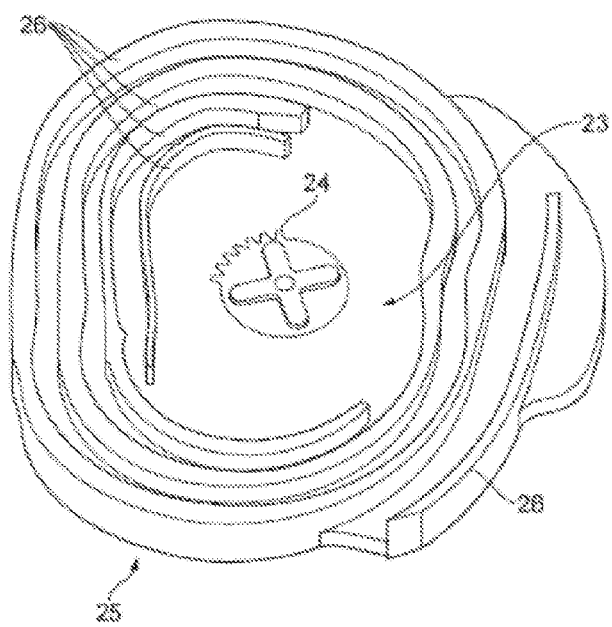
FIG. 6 shows a cam.

FIG. 6 shows a view of the cam 25 having the form of a plate, with the tracks 26 and the sector gear 23 formed as extrusions from the face of the plate. The cam has a counter balance mass on one edge in this example (not labelled).

It will, however, be understood that a plate arrangement is not necessary and that the tracks 26 could, for example, be connected to the sector gear 23 via a spoked arrangement. It will also be understood that the sector gear 23 may be integrally formed with the cam 25, rather than being provided as separate components splined or otherwise joined together in rotation.

Alternatively, the sector gear 23 might not be rigidly fixed to the tracks 26 and could be connected via, for example, a gear box or damping member which allows different rotation rates of the sector gear 23 and the tracks 26. For example, a planetary gear box with a 2:1 ratio could be used to connect the tracks 26 to the sector gear 23, so that the tracks 26 rotate twice as fast as the sector gear 23. This may, for example, allow the piston to take a four stroke cycle, where it engages the sector gear on only a single stroke, with a simpler track shape.

If such a gearbox was used, then a track having only a single radial maximum and a single radial minimum could be used.

As a further alternative, the sector gear 23 and the tracks 26 may rotate about different axes, being connected by a geared or belted connection.

The piston 18 may be connected to the rack 22 via a damping member for example a dashpot included in the piston rod 20, to reduce the peak force applied as the rack 22 engages and with and disengages from the toothed portion 24 of the sector gear 23.

Figure 7:
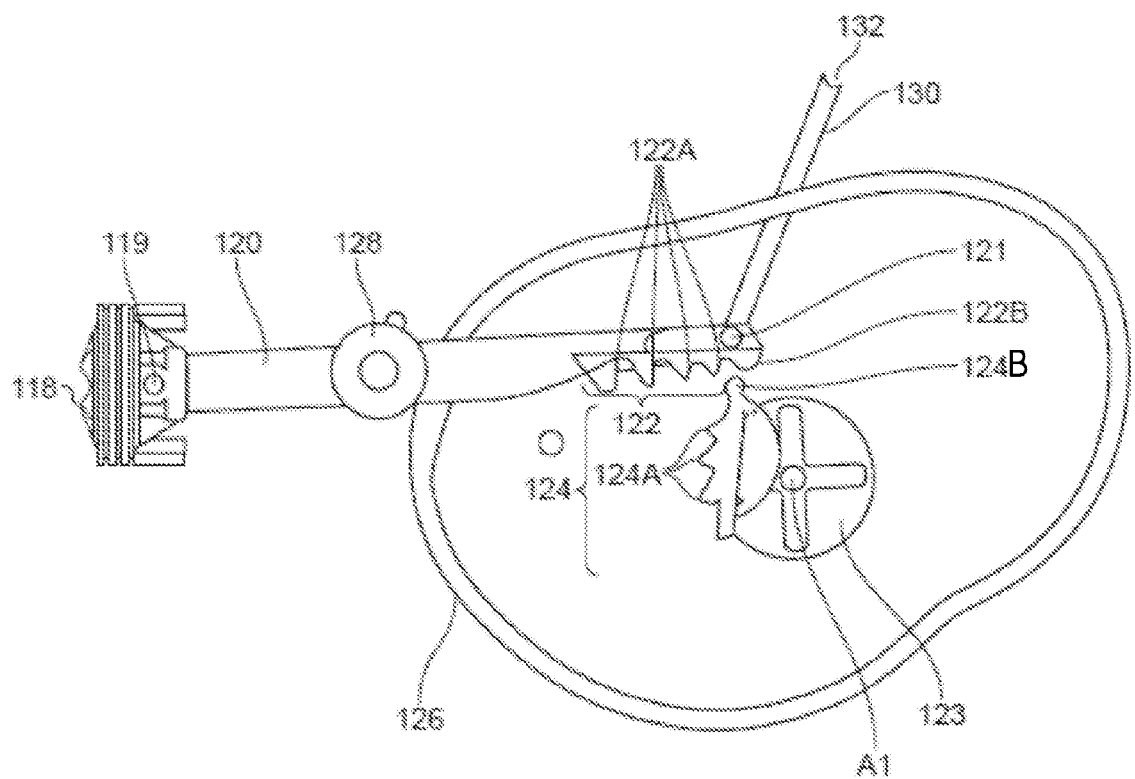
FIG. 7 shows a second piston arrangement.

FIG. 7 shows an alternative piston arrangement according to the invention. In FIG. 7, there is shown a piston 118 that reciprocates within a cylinder. The piston 118 is coupled to a first connecting member 120 via a pivot pin 119. At the opposite end of the first connecting member 120, the elongate connecting member 120 is coupled to a second connecting member 130 by a second pivot pin 121. The second connecting member 130 is pivotally fixed at point 132 so as to form a mechanism with the first connecting member 120 and the piston 118.

Point 132 is fixed relative to the cylinder in which piston 118 reciprocates. It will be understood that the engine may move such as within a vehicle but that there will be no relative movement between point 132 and the cylinder.

The first connecting member 120 further comprises an engagement profile 122 for engaging with a second engagement profile 124, the second engagement profile 124 being coupled to a rotatable element 123, which is rotatable about an axis A1.

There is no relative movement between the point 132 and axis A1.

The first engagement profile 122 comprises multiple engagement surfaces 122A and a primary engagement surface 122B. As can be seen, the engagement surfaces 122A are separated by differing pitches and have differing sizes and inclinations with respect to the first connecting element 120. This variation in properties across the engagement profile allows the first and second engagement profiles 122 and 124 to remain engaged as the mechanism formed by the piston 118, first connecting member 120 and second connecting member 130 moves on a piston drive store. It can also be seen that the primary first engagement surface 122B is at an-end most point of the first connecting member 120 so that engagement and power transfer with the primary second engagement profile 124A can occur at an early stage within the drive or expansion stroke of the piston.

The rotatable element 123 comprises the second engagement profile 124, which comprises multiple second engagement surfaces 124A for engaging with the respective engagement surfaces 122A of the first engagement profile. The engagement profile 124 also comprises a second primary engagement surface 124B, which will engage with the primary engagement surface 122B of the first engagement profile. It can be seen that the second engagement profile 122 extends around approximately 25% of the circumference of the rotatable element 123.

While the engagement profiles shown each have multiple engagement surfaces, a single engagement surface on the first connecting member 120 and a single engagement surface on the rotatable element 123 may be sufficient to provide power transfer, such a single tooth and slot arrangement.

The piston arrangement also comprises a track 126 and a follower 128, configured to roll along the track 126. A sliding follower could also be used, which would slide along the track 126. The follower 128 is coupled to the first connecting member 120 and the action of the track 126 and follower 128 can move the piston in 118 in a return stroke and the track 126 can be shaped in any way so as to provide differing speeds for differing strokes of a cycle. For example, a substantially non-simple harmonic movement of the piston is possible through the track and follower arrangement.

Figure 8:
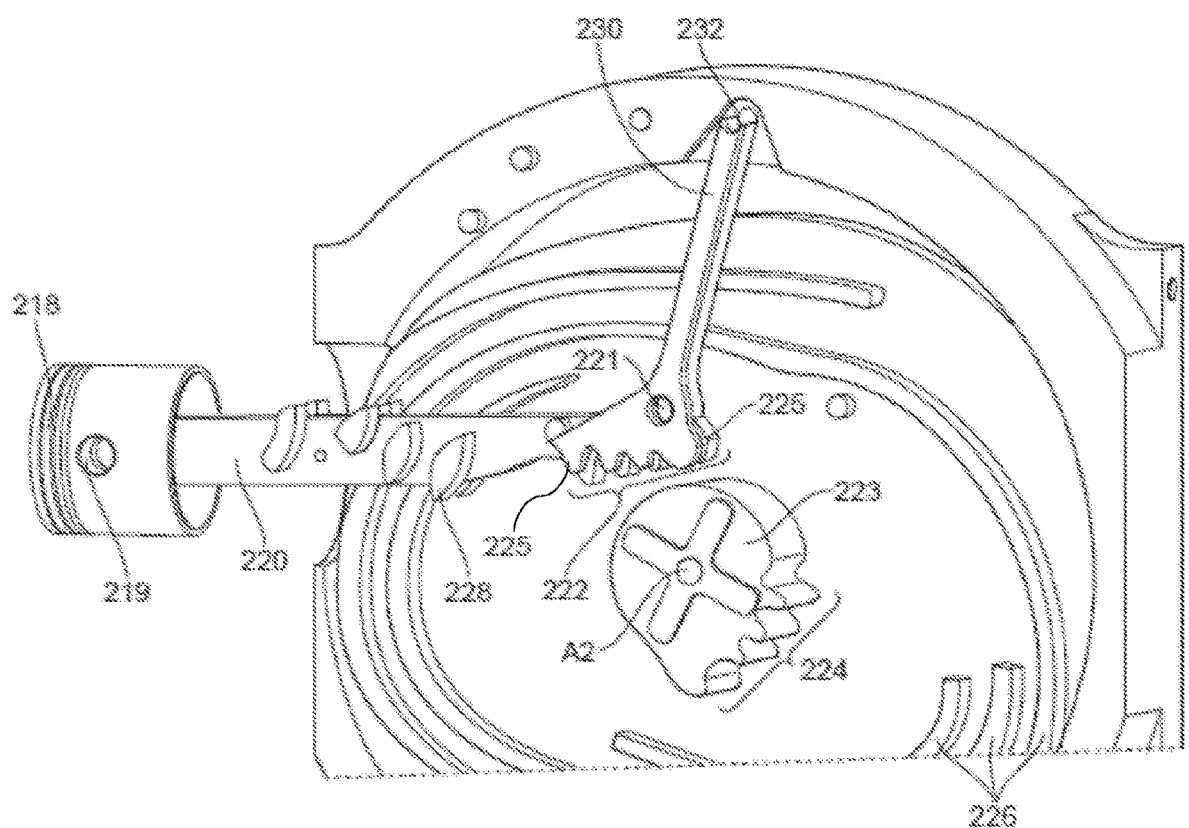
FIG. 8 shows a third piston arrangement.

FIG. 8 shows a further development on the piston arrangement shown in FIG. 7. In this arrangement, like parts are labelled with corresponding reference numerals and, for the sake of brevity, the descriptions of unchanged parts are not repeated here.

The rotatable element 223, which rotates about axis A2 has been made unitary with the engagement profile 224. However, the rotatable element 123 of FIG. 7 could equally be used in this context.

The second connecting element 230 has been modified so as to have a third engagement profile 225. The third engagement profile 225 lies substantially in line with the first engagement profile 222 at the point where both will engage with the first engagement profile 224. Thus, the force exerted on the rotatable element 223 can be spread across both the second and third engagement profiles 222, 225.

While the connection 219 is shown as being a pin joint, it is equally possible that the joint could be translatable in a direction perpendicular to the direction of movement of the piston while being non rotatable.

Figure 9:
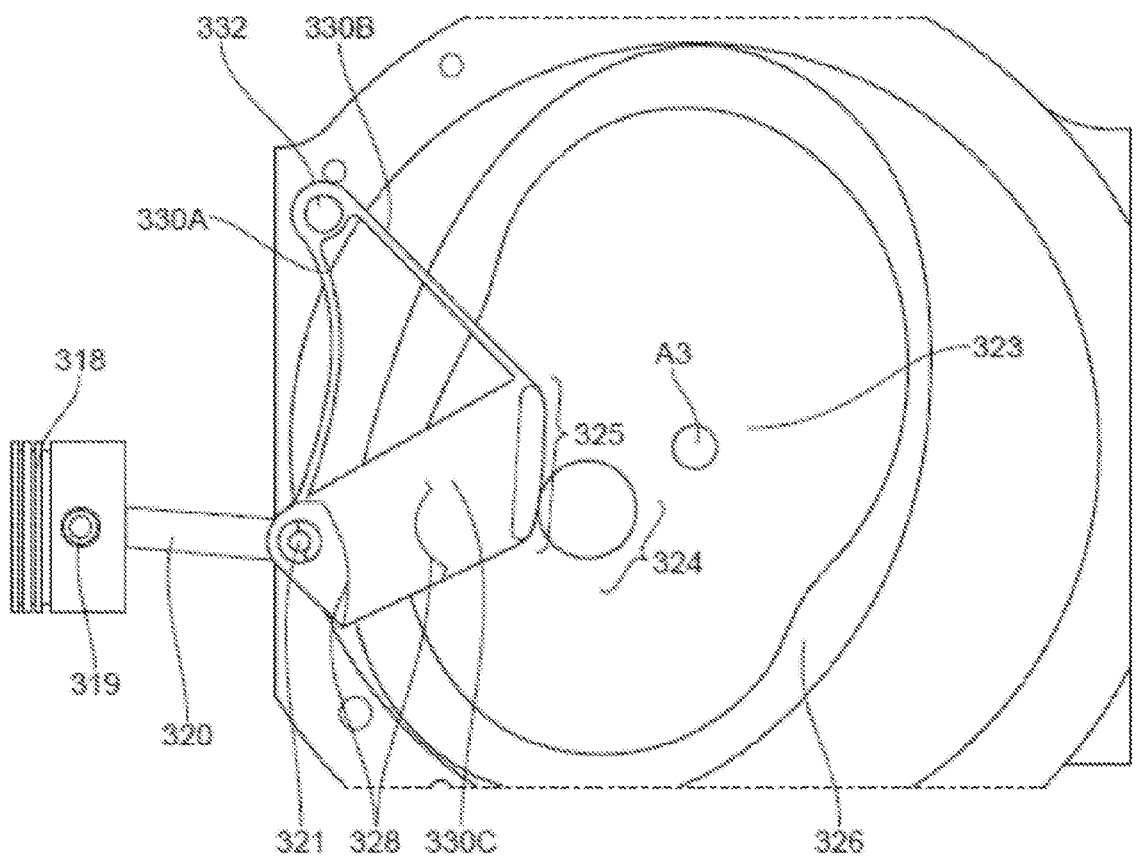
FIG. 9 shows a fourth piston arrangement.

Turning to FIG. 9, the arrangement shown in FIG. 8 has been adapted so that only the third engagement profile 325 engages with the rotatable element 323, which is rotatable about an axis A3. The second connecting member 330 is formed of three separate members. A first member 330a extends from the pivot point 332 to the pin joint for connecting to the first connecting member 320; the second member 330b extends between the pivot point 332 and the third engagement profile 325; and the third member 330c extends between the engagement profile 325 and the point join 321 between the first connecting member 320 and second connecting member 330. In order to reduce weight, there is a hollow space between the first, second and third members 330a, 330b, 330c. The pivot point 332 of the second connecting member 330 is separated from the piston by approximately 45°, the angle being measure at the axis A3. By moving the pivot point 332 closer to the piston 318, there is provided a greater lever arm at the point at which the drive stroke of the piston 318 begins.

As can be seen from FIG. 9, the first engagement portion 324 of the rotatable element 323 has been altered in order to engage with the third engagement portion 325.

Figure 10:
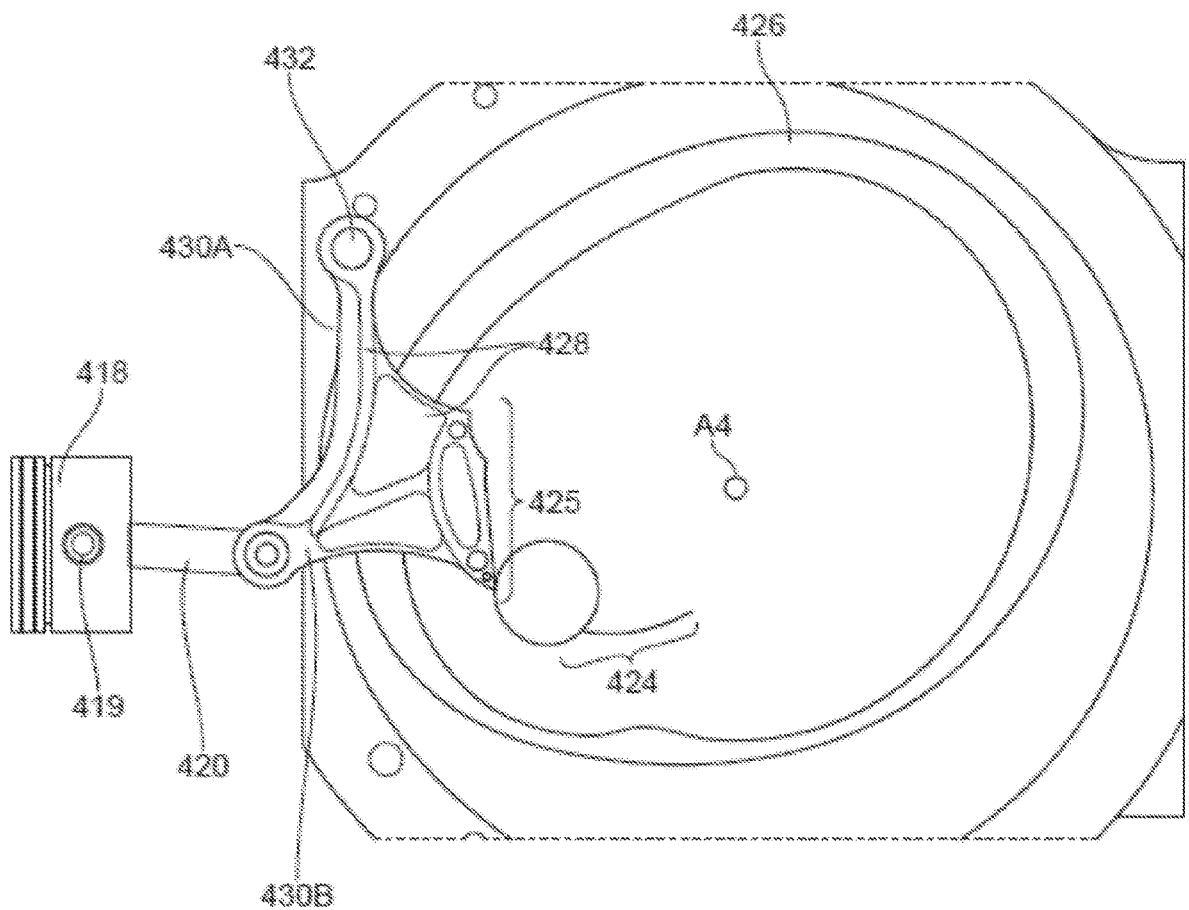
FIG. 10 shows a fifth piston arrangement.

In the arrangement shown in FIG. 10, the second connecting member 430 has been altered in shape so that it has a central block having the third engagement portion 425, which a first member 430a extending from the central portion to the pivot point 432 and a second member 430b extending from the central portion to the pin joint 421. It should also be noted that the followers 428 are disposed on the second member 430, as opposed to the first connecting member 420.

The first engagement portion 425 has been altered in shape so that it can fit with the second engagement portion 424, which is formed substantially as a cylindrical bearing and may be a rotatable bearing.

In any of the embodiments of FIGS. 7 to 10, the follower may be in the form of one or more rollers disposed on a pivot pin between the first and the second connecting members. The follower can be a single roller disposed between two tracks, or two rollers, one which engages a radially inner track and one which engages a radially outer track.

Although the invention has been described above with reference to one or more preferred embodiments, it will be appreciated that various changes or modifications may be made without departing from the scope of the invention as defined in the appended claims.

The invention claimed is:

1. A piston arrangement comprising:
a piston movable within a cylinder in reciprocating motion along a piston axis;
a first engagement profile movable with the piston;
a rotatable element having a second engagement profile configured to engage and disengage the first engagement profile and rotatable around a first axis; and
a track adapted to rotate relative to the cylinder around a track axis of rotation, the piston being coupled to the track,
wherein the rotatable element and the track are coupled in rotation.

2. The piston arrangement of claim 1, wherein the first engagement profile is rigidly coupled to the piston.

3. The piston arrangement of claim 1, wherein the track is rigidly coupled to the rotatable element.

4. The piston arrangement of claim 1, further comprising a follower coupled to the piston, the follower being arranged to run along a surface of the track.

5. The piston arrangement of claim 4, further comprising a plurality of followers, each follower being arranged to run along a surface of the track.

6. The piston arrangement of claim 4, further comprising a plurality of concentric tracks.

7. The piston arrangement of claim 1, arranged such that the piston reciprocates twice for each rotation of the rotatable element.

8. The piston arrangement of claim 1, wherein the second engagement profile extends around approximately 25% of the circumference of the rotatable element.

9. The piston arrangement of claim 1, wherein the track is formed as a protrusion from a plate, the plate being substantially planar in a plane normal to the track axis.

10. The piston arrangement of claim 9, wherein the rotatable element is coupled in rotation to the track by splines formed on the plate.

11. The piston arrangement of claim 1, further comprising a support section positioned adjacent to the first engagement profile when the first engagement profile is engaged with the second engagement profile.

12. The piston arrangement of claim 11, wherein the support section is coupled to the rotatable element, the support section being arranged to rotate with the rotatable element.

13. The piston arrangement of claim 1, wherein the piston is a first piston and the first engagement profile is a first first engagement profile, the piston arrangement further comprising a second piston and a second first engagement profile movable with the second piston, the second first engagement profile configured to engage and disengage the second engagement profile gear.

14. The piston arrangement of claim 13, wherein the second piston and the first piston are arranged to move in opposite directions.

15. The piston arrangement of claim 1, wherein the track has a shape such that the movement of the piston coupled to the track is substantially non simple harmonic.

16. An internal combustion engine comprising a piston arrangement according to claim 1.

17. The internal combustion engine of claim 16, wherein the rotatable element is splined or otherwise connected to an output shaft of the engine, such that the rotational speeds of the output shaft and the rotatable element are matched.

18. The piston arrangement of claim 1, wherein the rotatable element rotates about the first axis in a single direction as the piston moves in reciprocating motion along a piston axis within the cylinder.

19. The piston arrangement of claim 8, wherein the second engagement profile engages the first engagement profile only during a single stroke of the engine.

20. The piston arrangement of claim 18, wherein the second engagement profile engages the first engagement profile only during an expansion stroke.

* * * * *